A. CAMPBELL.
INSTRUMENT FOR REGULATING TEMPERATURE.
No. 169,339. Patented Nov. 2, 1875.
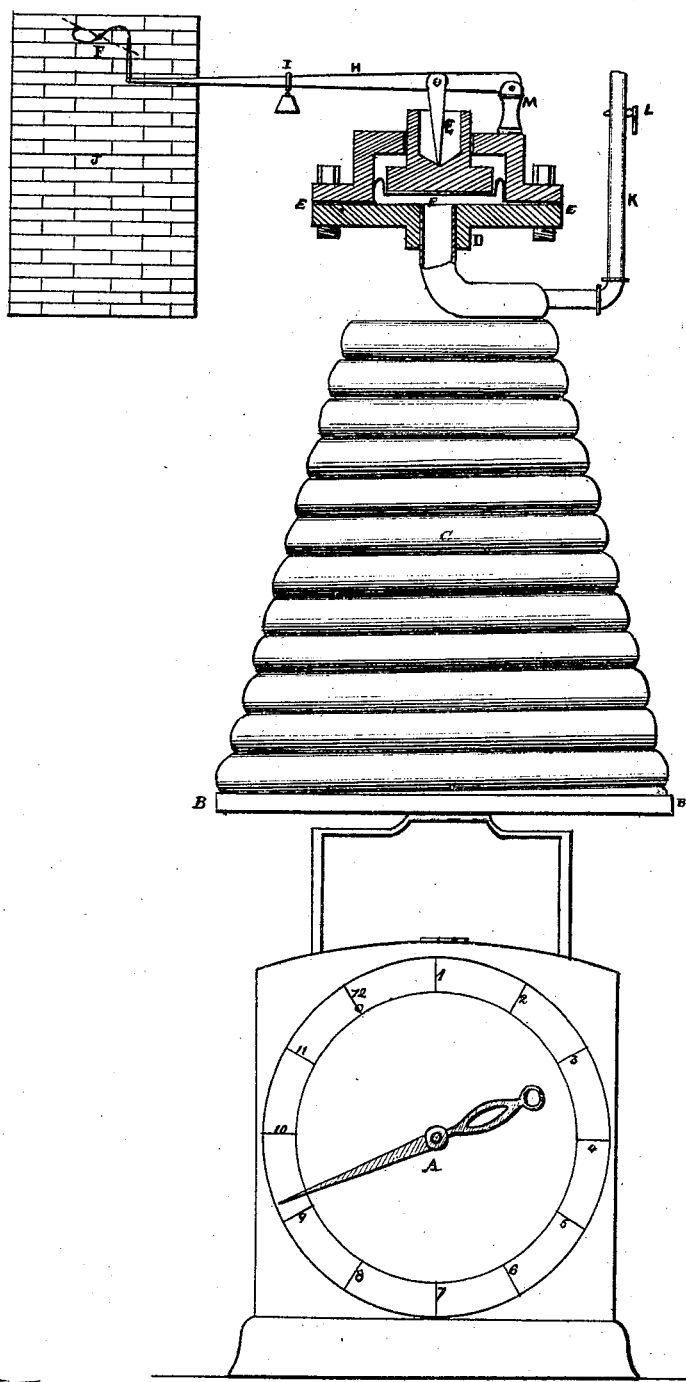

UNITED STATES PATENT OFFICE.

AUGUSTINE CAMPBELL, OF WOODBRIDGE TOWNSHIP, MIDDLESEX COUNTY, NEW JERSEY.

IMPROVEMENT IN INSTRUMENTS FOR REGULATING TEMPERATURES.

Specification forming part of Letters Patent No. 169,339, dated November 2, 1875; application filed March 23, 1875.

*To all whom it may concern:*

Be it known that I, AUGUSTINE CAMPBELL, of the township of Woodbridge, county of Middlesex, State of New Jersey, have invented a new and useful Improvement in Automatic Instruments designed to regulate and control artificial temperatures, which instruments could be used in a variety of manufacturing establishments to regulate and control automatically the temperature of various mechanical and chemical processes, as well as to control and regulate the temperature of the air in private dwellings, as well as public buildings.

I employ a vessel or coil containing water or other fluid, which, when heated to a given temperature, will, by its expansion, give motion to a rod, through the medium of a diaphragm, which rod, being suitably connected with a damper in the furnace-chimney, will cause it to partially or wholly open or close, as the heat around said vessel is increased or diminished, thereby maintaining a uniform temperature in any inclosed space where the vessel may be located. This vessel or coil rests upon a spring-balance in such a manner that any loss of the liquid in the coil will be indicated on the dial.

My invention consists in so combining these devices that the draft and temperature will be regulated and loss of liquid indicated.

In practice it is found that the fluid contained in said vessel, in time, usually wastes more or less away, and thereby deranges the action of the instrument, and the improvement now made is intended to remedy this defect.

In the accompanying drawings, in vertical section, which constitute a part of this specification, C is the vessel or coil containing the fluid to be acted upon by the changes of temperature. The lower end of the coil is closed. To the upper end is attached a contrivance marked E E E, well known as Clark's regulator for controlling the fires of steam-boilers by means of steam-pressure; and as the vessel C has the same relation to said contrivance as a steam-boiler would have, it follows that with a suitable fluid it would, by any change of temperature, actuate the diaphragm of said contrivance, and through it the lever H, which would turn the damper F in the chimney J.

The above-described apparatus rests on the platform B B of the spring-balance A, which indicates the weight of the whole apparatus, together with its contained fluid. Should said fluid, from any cause, be diminished in quantity, it will be indicated by the balance, thereby enabling the operator to promptly correct it, either by changing the position of the weight I on the lever H, or by supplying additional fluid.

What I claim as my invention, and desire to secure by Letters Patent, is—

The combination of the balance A with the coil or vessel C, regulator E E E, and damper F, as and for the purposes specified.

AUGUSTINE CAMPBELL.

Witnesses:
PATRICK CLARK,
DANIEL P. CLARK.